United States Patent
Qiu et al.

(10) Patent No.: US 9,384,769 B2
(45) Date of Patent: Jul. 5, 2016

(54) WRITE POLE CONFIGURATION

(71) Applicant: Seagate Technology LLC, Cupertino, CA (US)

(72) Inventors: Jiaoming Qiu, Maple Grove, MN (US); Lei Lu, Bloomington, MN (US); Xuelian Xu, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/867,573

(22) Filed: Sep. 28, 2015

(65) Prior Publication Data

US 2016/0133290 A1 May 12, 2016

Related U.S. Application Data

(62) Division of application No. 14/535,481, filed on Nov. 7, 2014, now Pat. No. 9,171,557.

(51) Int. Cl.
| | |
|---|---|
| *G11B 5/147* | (2006.01) |
| *G11B 5/60* | (2006.01) |
| *G11B 5/127* | (2006.01) |

(52) U.S. Cl.
CPC ............ *G11B 5/6082* (2013.01); *G11B 5/1272* (2013.01); *G11B 5/1278* (2013.01); *G11B 5/147* (2013.01)

(58) Field of Classification Search
CPC ................................ G11B 5/147; G11B 5/127
USPC ............. 360/123.02–123.06, 123.09, 123.19, 360/125.3, 125.06, 125.12
See application file for complete search history.

(56) References Cited

U.S. PATENT DOCUMENTS

| | | | |
|---|---|---|---|
| 5,703,740 A | 12/1997 | Cohen et al. | |
| 6,104,576 A | 8/2000 | Santini | |
| 6,176,005 B1 * | 1/2001 | Garfunkel | G11B 5/313 29/603.14 |
| 7,940,495 B2 | 5/2011 | Sasaki et al. | |
| 8,233,233 B1 | 7/2012 | Shen et al. | |
| 8,405,930 B1 * | 3/2013 | Li | G11B 5/1278 29/603.14 |
| 8,503,130 B1 | 8/2013 | Sasaki et al. | |
| 8,619,390 B2 | 12/2013 | Cazacu et al. | |
| 8,619,509 B1 | 12/2013 | Rivkin et al. | |
| 8,619,514 B1 * | 12/2013 | Matsumoto | G11B 5/314 369/13.33 |
| 8,619,515 B1 * | 12/2013 | Matsumoto | G11B 5/314 369/13.33 |
| 8,670,212 B2 | 3/2014 | Bai et al. | |
| 8,790,523 B2 | 7/2014 | Watanabe et al. | |
| 8,808,524 B2 | 8/2014 | Seets et al. | |
| 2005/0047012 A1 * | 3/2005 | Lille | G11B 5/187 360/125.59 |
| 2005/0174686 A1 | 8/2005 | Takano | |
| 2008/0273276 A1 * | 11/2008 | Guan | G11B 5/3116 360/319 |
| 2010/0061016 A1 * | 3/2010 | Han | G11B 5/1278 360/125.3 |
| 2010/0157475 A1 | 6/2010 | Hsiao et al. | |

(Continued)

FOREIGN PATENT DOCUMENTS

JP 402130710 A 5/1990

*Primary Examiner* — Allen T Cao
(74) *Attorney, Agent, or Firm* — HolzerIPLaw, PC

(57) ABSTRACT

A write head having a write pole with a tip portion defining a pole tip and a paddle portion extending from the tip portion away from the pole tip, the paddle portion defining a back edge. The write head also has a coil structure having at least two active turns crossing the paddle portion, wherein a back of the coil structure is no more than 1 micrometer past the back edge of the write pole. In some implementations, a length from the pole tip to the back edge is no more than 4.5 micrometers.

19 Claims, 6 Drawing Sheets

(56) References Cited

U.S. PATENT DOCUMENTS

| | | | |
|---|---|---|---|
| 2010/0302672 A1 | 12/2010 | Aoki et al. | |
| 2011/0051293 A1* | 3/2011 | Bai | G11B 5/1278 360/313 |
| 2011/0220611 A1* | 9/2011 | Mino | G11B 5/1278 216/22 |
| 2011/0273800 A1* | 11/2011 | Takano | G11B 5/1278 360/125.12 |
| 2012/0044598 A1* | 2/2012 | Bai | G11B 5/1278 360/123.12 |
| 2012/0075749 A1* | 3/2012 | Wu | G11B 5/1278 360/123.12 |
| 2014/0168816 A1 | 6/2014 | Gubbins et al. | |
| 2014/0169146 A1 | 6/2014 | Yin et al. | |

* cited by examiner

WRITE POLE CONFIGURATION

CROSS-REFERENCE

This application is a divisional application of U.S. application Ser. No. 14/535,481, filed Nov. 7, 2014, now issued as U.S. Pat. No. 9,171,557, the entire disclosures of which are incorporated herein by reference.

BACKGROUND

A disc drive is an example of a data storage system that uses magnetic fields for writing and reading data. Transducers write information to and read information from data surfaces of the discs. In one example, transducers include a recording or write head for generating a magnetic field that aligns the magnetic moments of a magnetic medium to represent desired bits of data. Magnetic recording heads include both longitudinal and perpendicular recording techniques. Perpendicular recording is a form of magnetic recording in which magnetic moments representing bits of data are oriented perpendicularly to the surface of the recording layer. Perpendicular magnetic write heads typically include main and return poles that are separated to form a write gap and extend from pole tips located at an air-bearing surface (ABS) to a back gap region. A coil is included to generate magnetic flux through the main and return poles in response to a current conducted through the coil. The write pole tip focuses the magnetic flux density such that the magnetic fields interact with the magnetic medium to orient its magnetic moments in an up or down direction.

As the desire for higher data rate and higher data density increases in magnetic memory storage, great challenges are placed on magnetic write head design.

SUMMARY

Implementations described and claimed herein provide a write head comprising a write pole and a coil structure around the write pole, the write pole extending no more than 1 micrometer past the coil structure. In some implementations, the coil structure has no more than two active turns present on the trailing side and the leading side of the write pole.

One particular implementation is a write head having a write pole with a tip portion defining a pole tip and a paddle portion extending from the tip portion away from the pole tip, the paddle portion defining a back edge. The write head also has a coil structure having at least two active turns crossing the paddle portion, wherein a back of the coil structure is no more than 1 micrometer past the back edge of the write pole.

Another particular implementation is write head having a pole tip proximate to an air-bearing surface and a back edge, with a length from the pole tip to the back edge being no more than 4.2 micrometers in a direction perpendicular to the air bearing surface.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTION

Figure 1:
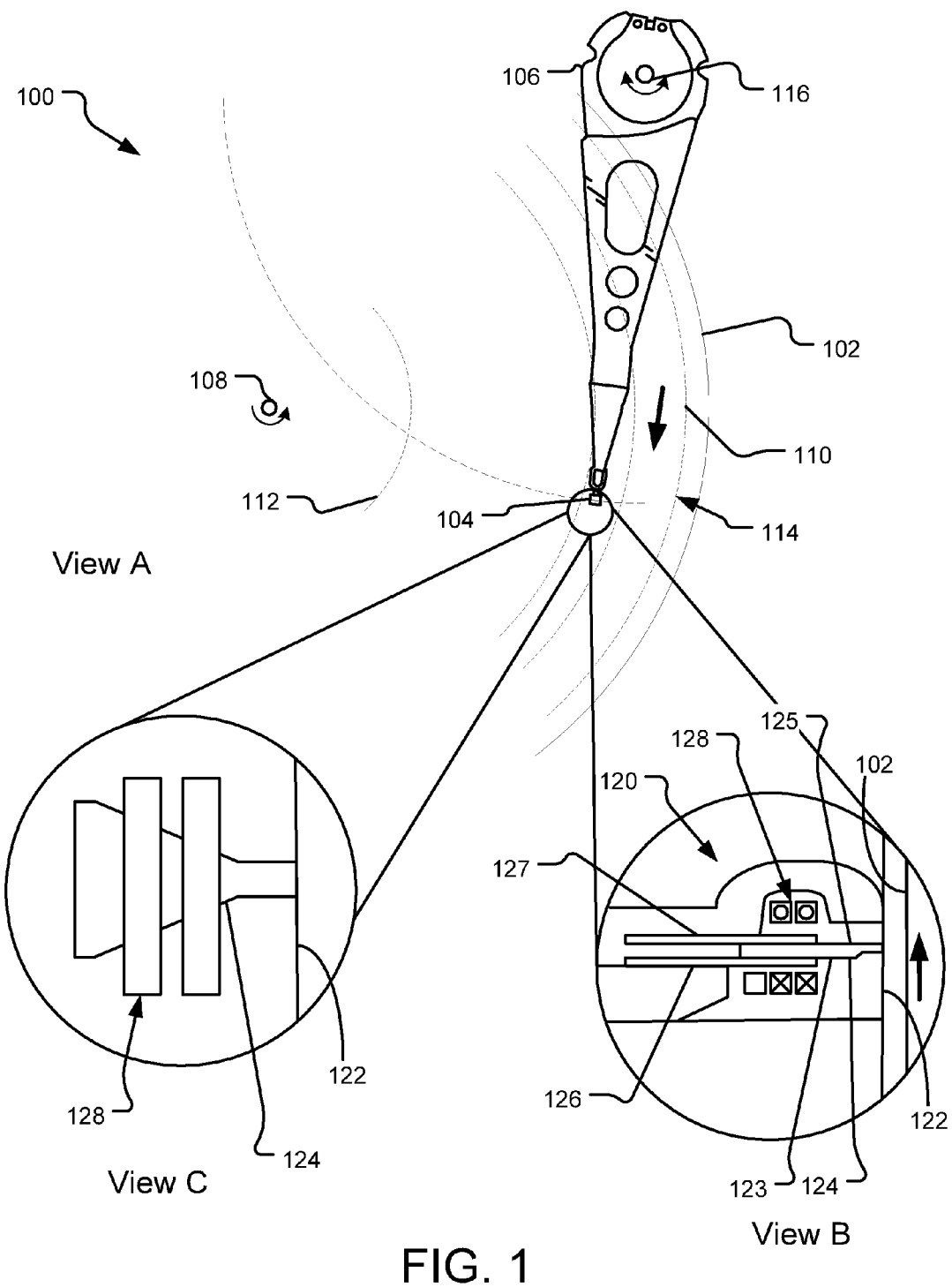
FIG. 1 is a schematic top view of storage device having an example write head implemented on an end of an actuator assembly.

As indicated above, the desire for higher data rate and higher areal density results in great challenges in designing the magnetic write head. In perpendicular recording, the write head 'writes' information into the recording media by switching the writer's magnetic field from one polarity to the other through a driving current waveform change. When recording at high data rate (HDR), the switching speed increases. Normally, the write field magnitude will be degraded and magnitude variation will be enlarged with data rate increase. These not only cause poorer media saturation, but also cause worse transition sharpness between bits. In addition, since write field bubble expansion is slower at the track edge than in the track center, the transition curvature along the cross-track direction will become larger as the data rate increases. All these HDR effects cause a poorer signal-to-noise ratio (SNR) for the recording information. The basic requirements for writer design for high areal density recording (e.g., high linear density and high track density) include providing strong writeability, confining the field in the down-track and cross-track directions, and reducing the erase field. In the push to increase track density, reducing the trailing edge physical width of the write pole tip directly helps reduce track pitch. However, with a write field of the same magnitude, reducing write pole width could cause larger track inflation and increase of the adjacent track fringing field. The large adjacent track fringing field will degrade the write field cross-track gradient and worsen the track edge erase band. This in turn will limit the track density push. Confining the field in the cross-track direction by including a side shield in the writer, for example, will improve cross-track field gradient and reduce the erase band. Thus, the track density may see a big improvement. However, a reliability issue is during transition writing; magnetization's dynamic activity in a side shield will cause a side track erasure field that will ruin the recording information in side tracks.

The present disclosure provides writer designs, or write head designs, that can significantly increase the write speed (e.g., faster switching) and improve driving current-write field efficiency, thus benefiting HDR performance. The write designs have a shorter magnetic field rise time while decreasing the coil power needed to achieve the magnetic field. The lower coil power will correspond to lower erasure field, benefiting writer's reliability.

An implementation of a recording head disclosed herein includes a write pole with a coil structure around the write pole; the coil structure may be a two-turn coil structure or a three-turn coil structure. The write pole has a tip portion and a paddle portion including a flared region. The write pole has a length defined by a pole tip of the tip portion and a back edge of the paddle portion. The back edge of the write pole is no more than 1 micrometer behind (i.e., in the direction away from the ABS surface) the back edge of the coil structure, in some implementations no more than 0.8 micrometer behind.

As an example, in some implementations having a two-turn coil configuration, the write pole length is no more than 4.5 micrometers, in other implementations no more than 4.2 micrometers, and in other implementations no more than 3.9 micrometers. Particular example write pole lengths include 3.9 micrometers and 4.2 micrometers.

Such a 'truncated paddle', extending no more than 1 micrometer behind the coil structure, decreases writer erasure caused by side shields of the writer head and thus improves the writer's reliability. Additionally, a shorter write pole requires less high magnetic moment material, decreasing the cost of the write pole and the overall write head.

In the following description, reference is made to the accompanying drawing that forms a part hereof and in which are shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a storage device 100 having an example recording head structure implemented on an end of an actuator assembly. Specifically, FIG. 1, View A, illustrates a top plan view of an implementation of a magnetic media or disc 102 with a transducer head 104 situated on an end of an actuator assembly 106. Disc 102 rotates about a disc axis of rotation 108 during operation in the direction indicated. Further, disc 102 includes an outer diameter 110 and inner diameter 112 between which are a number of data tracks 114, illustrated by dotted lines. Data tracks 114 are substantially circular and are made up of regularly spaced patterned bits.

Information may be written to and read from the patterned bits on data tracks 114 through the use of actuator assembly 106, which rotates during a data track 114 seek operation about an actuator axis of rotation 116. Transducer head 104, mounted on actuator assembly 106 at an end distal from the actuator axis of rotation 116, flies in close proximity above the surface of disc 102 during disc operation; the surface of transducer head 104 opposite to disc 102 is known as the air bearing surface (ABS). Transducer head 104 includes a recording head including a read pole for reading data from track 114 and a write pole for writing data to track 114.

View B of FIG. 1 illustrates an expanded view of a partial cross-sectional configuration of transducer head 104, particularly, of a write head portion 120 of transducer head 104. Write head 120 is illustrated with its air bearing surface (ABS) 122 near magnetic media or disc 102. The direction of rotation of disc 102 is indicated in the expanded view.

Specifically, write head 120 includes a main pole 124 (also referred to as the write pole) configured to write data to disc 102 by a magnetic field. Write pole 124 is made of a ferromagnetic material such as, but not limited to, iron (Fe), cobalt (Co), nickel (Ni), and combinations thereof. For example, write pole 124 can comprise an alloy such as, but not limited to, iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), cobalt and iron nitride (CoFeN), and the like.

Write pole 124 has a leading edge side 123 and a trailing edge side 125; leading edge side 123 engages disc 102 prior to write pole 124 engaging disc 102 as disc 102 spins, and trailing edge side 125 engages disc 102 after write pole 124 engages disc 102 as disc 102 spins. In some implementations, the features on leading edge side 123 are called the "bottom" or "lower" and the features on trailing edge side 125 are called the "top" or "upper." Write head 120 also includes a yoke 126 on leading edge side 123 and a yoke 127 on trailing edge side 125. Yokes 126, 127 facilitate switching of the magnetic flux in write pole 124 and assist in channeling the magnetic flux towards trailing edge side 125 of write pole 124. Yokes 126, 127 are made of a high magnetic moment material, such as iron cobalt (FeCo), cobalt iron nickel (CoFeNi), and the like.

Write head 120 is energized using a coil structure 128 present around write pole 124 and yokes 126, 127. Coil structure 128 may be a helical coil wrapped around write pole 124 and yokes 126, 127, or coil structure 128 may be composed of planar coils present on leading edge side 123 and trailing edge side 125. Coil structure 128 is made of an electrically conductive material such as, but not limited to, copper (Cu), silver (Ag), gold (Au), and combinations thereof. Coil structure 128 generates a magnetic field to rotate the magnetization in yokes 126, 127 and write pole 124 from behind ABS 122; the rotation or switching happens when a magnetic domain wall propagates to the ABS 122.

Coil structure 128 of write head 120 is present around write pole 124 and yokes 126, 127, having a plurality of turns on leading edge side 123 and trailing side edge 125 of write pole 124. Specifically, coil structure 128 has two active turns on leading edge side 123 and on trailing edge side 125. In the illustrated implementation, a non-active or dummy turn is also present on leading edge side 123. Coil structure 128 defines a "core", which is the magnetic materials between the turns of coil structure 128; for example, when coil structure 128 is a helical coil, the core includes the magnetic materials around which coil structure 128 is wound. In this illustrated implementation, write head 120 has a lower core that includes write pole 124 and yoke 126, and an upper core that includes write pole 124 and yoke 127.

View C of FIG. 1 illustrates a top view of write pole 124 and coil structure 128, orthogonal to the orientation of View B. Write pole 124 extends no more than 1 micrometer past coil structure 128 (i.e., in the direction away from the ABS 122). Additional details of write head 120 are provided in respect to FIG. 2.

Figure 2:
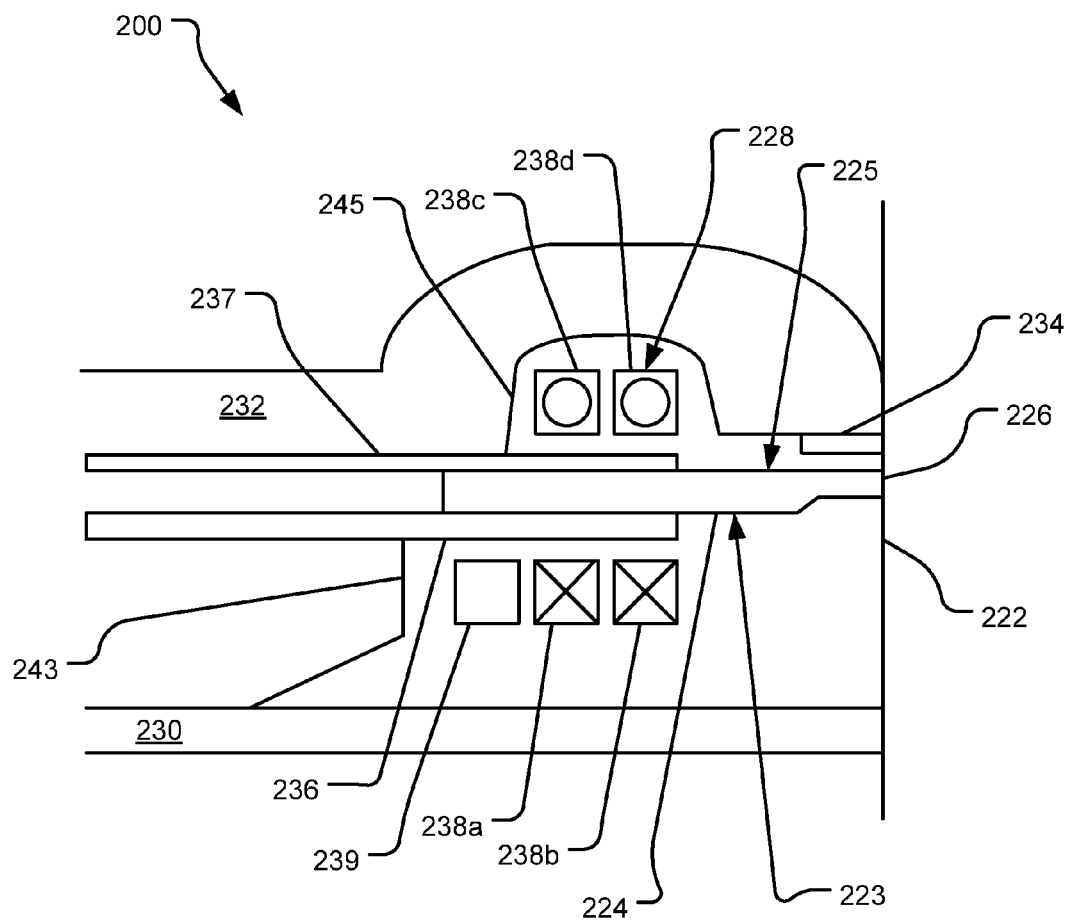
FIG. 2 is a schematic cross-sectional side view of another example write head.

FIG. 2 illustrates a more detailed view of the write head from FIG. 1. In FIG. 2, write head 200 has an air bearing surface (ABS) 222, a write pole 224 (also referred to as the write pole) having a leading edge side 223 and a trailing edge side 225. Write pole 224 has a pole tip 226 proximate the ABS 222 and a back edge (not called out) opposite pole tip 226. On leading edge side 223 of write pole 224 is a leading yoke 236 recessed from pole tip 226, and on trailing edge side 225 is a trailing yoke 237 recessed the same distance from pole tip 226. Thus, in this illustrated implementation, leading yoke 246 and trailing yoke 237 are aligned with each other; in other implementations, they are not aligned.

A coil structure 228 is present around write pole 224 and yokes 236, 237; coil structure 228 can be a helical coil wrapped twice around write pole 224 and yokes 236, 237, or coil structure 228 can have two sets of planar coils, one set present on leading edge side 223 and the other on trailing edge side 225. In this illustrated implementation, the front-most edge of coil structure 228 is aligned with both yokes 236, 237;

in other implementations, the front-most edge of coil structure 228 may be closer to the ABS 222, or recessed from the ABS 222.

Write head 200 has a first return pole (RP1) 230 on leading edge side 223 of pole 224 and a second return pole (RP2) 232 on trailing edge side 225 of pole 224. RP2 232 includes a front shield 234 extending towards write pole 224 at the ABS 222. A first back via 243 connects write pole 224 to RP1 230 by way of yoke 236 and a second back via 245 connects write pole 224 to RP2 232 by way of yoke 237. Write head 200 has a core length measured between the ABS 222 and the trailing side back via, second back via 245.

Coil structure 228 has a plurality of turns 238, in this implementation, two turns 238a, 238b on leading edge side 223 and two turns 238c, 238d on trailing side edge 225. These turns 238 are "active" turns, in that they are configured to conduct a current, thus creating a magnetic flux. Coil structure 228 extends between write pole 224 and RP1 230 and between write pole 224 and RP2 232. For example, coil structure 228 is formed as a helical coil wrapped around write pole 224. As another example, coil structure 228 has two sets of planar coils, one on the leading side between write pole 224 and RP1 230 and the other on the trailing side between write pole 224 and RP2 232. Each turn 238 of coil structure 228 is connected in series with the other turns 238 of coil structure 228. However, any suitable configuration of coil structure 228 can be utilized; for example, coil structure 228 can comprise a plurality of coils (e.g., two coils) both forming separate electric circuits. In one implementation, a dielectric or insulating material (not shown), such as alumina ($Al_2O_3$), electrically insulates coil structure 228 from write pole 224 and RP1 230 and from write pole 224 and RP2 232.

The two active turns 238 of coil structure 228, whether a helical coil or planar coils, are present around write pole 224. In implementations of a write head having three active turns of the coil structure, two or three of the active turns can be present around the write pole. That is, at least two active turns are around the coil structure and are closer to the ABS 222 than the back edge of write pole 224.

As a result of the current flowing through coil structure 228, a magnetic flux density is generated in write pole 224 and a magnetic flux density is generated in front 234. The direction of the current flowing in coil structure 228 is selected such that the magnetic flux density is directed towards the ABS 222. Such magnetic flux density through the ABS into the magnetic media and may be used to cause perpendicular recording in the media.

Coil structure 228 also includes, on leading edge side 223, a dummy turn 239, which does not conduct current. Dummy turn 239 may or may not be electrically conductive, and/or may or may not be magnetic. Dummy turn 239 may be physically connected to active turn 238a or may be physically separated from any and all active turns 238. Dummy turn 239 may be overlap or be 'around' write pole 224, or may be recessed farther from the ABS 222 than the back edge of write pole 224.

To reduce potential flux leakage from coil structure 228 to leading back via 243 and other bulky magnetic materials far away from the ABS 222, the distance between any active turn 238 (particularly, active turn 238a) and back via 243 is increased. Although the area between active turn 238a and back via 243 could be filled with the dielectric or insulating material (e.g., alumina) surrounding coil structure 228, dummy turn 239 is provided to fill the area with, for example, a less expensive material. In some implementations, dummy turn 239 is provided to facilitate forming (e.g., by plating, deposition, etc.) of write head 200 and its various elements.

By including one dummy turn 239, leading back via 243 is offset from trailing back via 245 (i.e., the distance from the ABS 222 to leading back via 243 is different than the distance from the ABS 222 to trailing back via 245); in other words, leading back via 243 does not coincide with trailing back via 245, and vice versa. With this offset, the opportunity exists to tune the flux path of the leading edge side 223 in relation to the trailing edge side 225 and rebalance the write flux for optimal on-track performance and reduce erasure flux.

FIGS. 3 through 6 illustrate four implementations of write poles where the back edge of the pole is no more than 1 micrometer past the last coil turn. Additionally, the overall length of the write pole is no greater than 4.5 micrometers.

Figure 3:
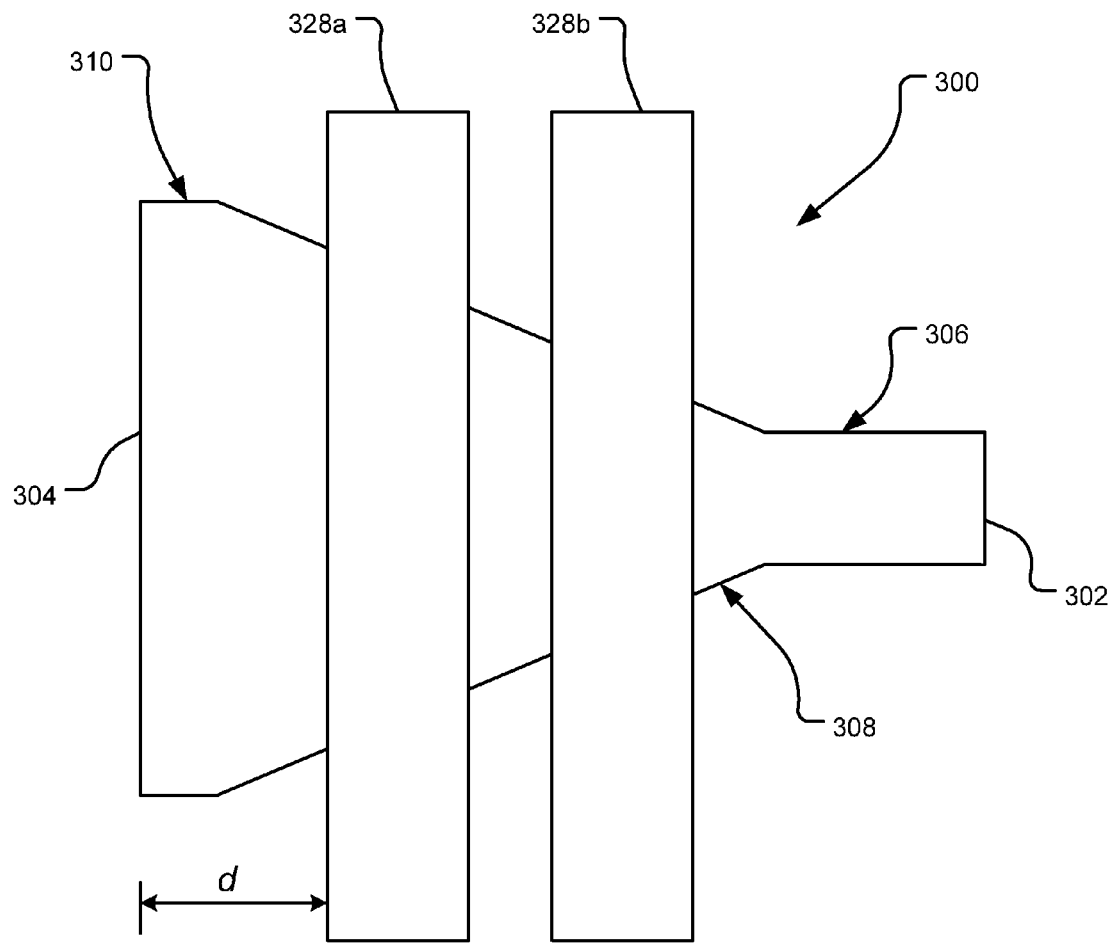
FIG. 3 is a schematic plan top view of an example write pole.

Turning to FIG. 3, a write pole 300 has a pole tip 302 (which, when included in a write head, is proximate an ABS) and an opposite back edge 304. Between pole tip 302 and back edge 304, write pole 300 has a tip portion 306, a flared portion 308 and, in this implementation, a back extension region 310; together, flared portion 308 and back extension region 310 form a paddle or paddle portion. Flared portion 308 is a transition region between tip portion 306 and back extension region 310, increasing in width as the distance from pole tip 302 (and the ABS surface) increases. A coil structure, having two active turns 328a, 328b, crosses flared portion 308. The distance "d" between the back edge of active turn 328a and back edge 304 is no more than 1 micrometer; in some implementations, "d" is no more than 0.8 micrometer. This distance behind the back edge is less than previously found in write heads. The length of write pole 300, from pole tip 302 to back edge 304, which is perpendicular to the ABS, is no more than 4.5 micrometers, in other implementations no more than 4.2 micrometers, in other implementations no more than 3.9 micrometers, and in other implementations no more than 3.6 micrometer. Particular example lengths for write pole 300 include 3.6 micrometers, 3.9 micrometers and 4.2 micrometers. This length of write pole 300 is less than previously found in write poles.

Write pole 300 is formed from a high magnetic moment material, such as one having a moment of 2.4T or higher; examples of such materials include alloys of iron and cobalt (FeCo), iron and nickel (FeNi), cobalt, iron and nickel (CoFeNi), iron and aluminum nitride (FeAlN), iron and tantalum nitride (FeTaN), cobalt, iron and boron (CoFeB), and cobalt and iron nitride (CoFeN).

It was found that by reducing the amount of high magnetic moment material in the write pole, the amount of side track erasure field, stemming from the side shields of the write head, is reduced. By reducing the amount of high magnetic moment material behind the coil structure, the write field at the pole tip was not deleteriously affected, compared to implementations where the amount of high magnetic moment material was reduced in front of or within the coil structure. In other words, removing a portion of previously present high magnetic moment material (i.e., write pole material) from behind the coil structure (e.g., from the back extension region 310) provides a write head with better writer efficiency (e.g., less erasure and better write field) than a write head where high magnetic moment material was removed from flared portion 308 or from tip portion 306. The removed high magnetic moment material is replaced with a lower magnetic moment material (e.g., 1.6T, or 1.4T, or, the same or similar material used for return poles).

Figure 4:
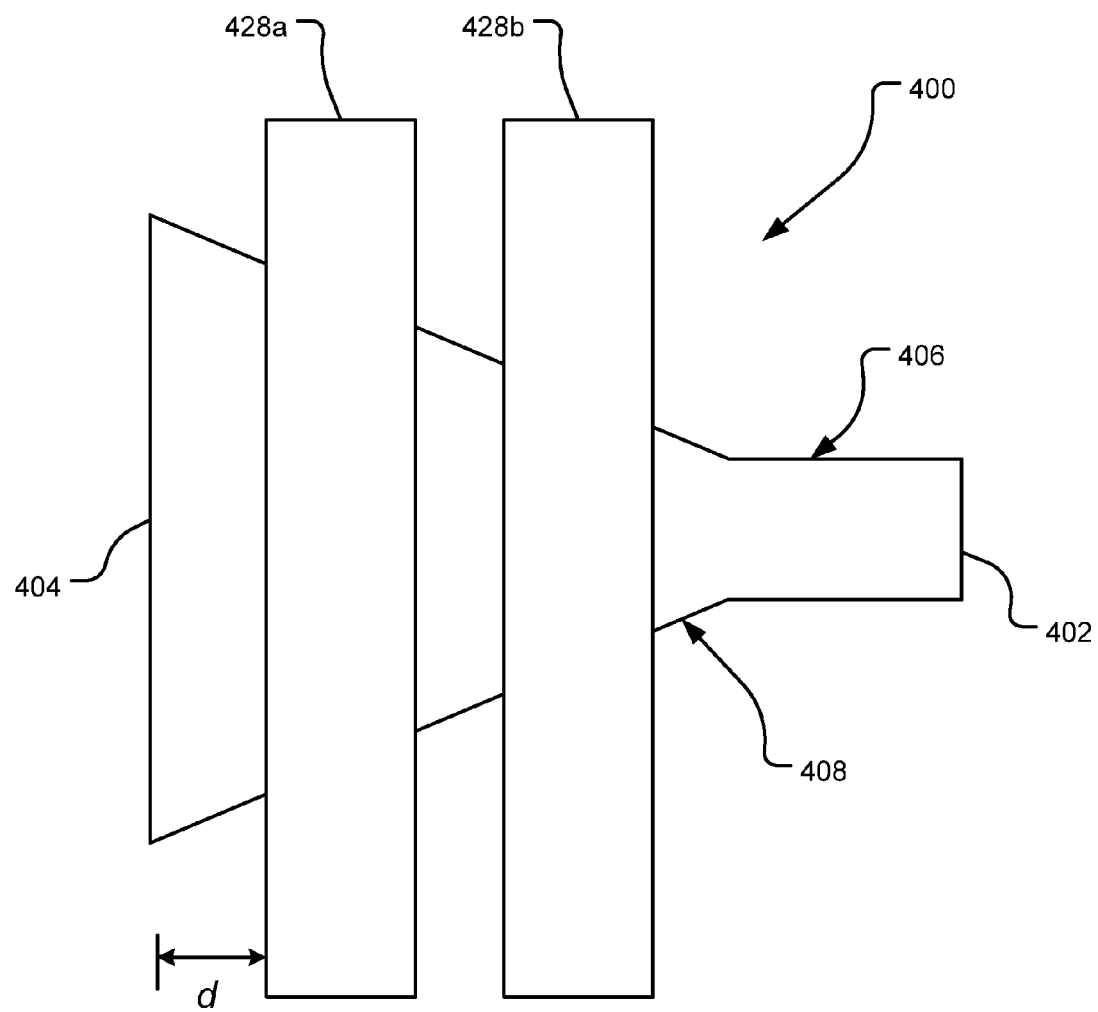
FIG. 4 is a schematic plan top view of another example write pole.

FIG. 4 illustrates another schematic example implementation of a write pole 400. Various elements or features of write pole 400 are the same as or similar to the corresponding element or feature of write pole 300, unless indicated otherwise.

Write pole 400 has a pole tip 402 (which, when included in a write head, is proximate an ABS) and an opposite back edge 404. Between pole tip 402 and back edge 404, write pole 400 has a tip portion 406 and a flared portion 408, which is the paddle portion for this implementation. A coil structure, having two active turns 428a, 428b, crosses flared paddle portion 408. The distance "d" between the back edge of active turn 428a and back edge 404 is no more than 1 micrometer; in some implementations, "d" is no more than 0.8 micrometer.

Figure 5:
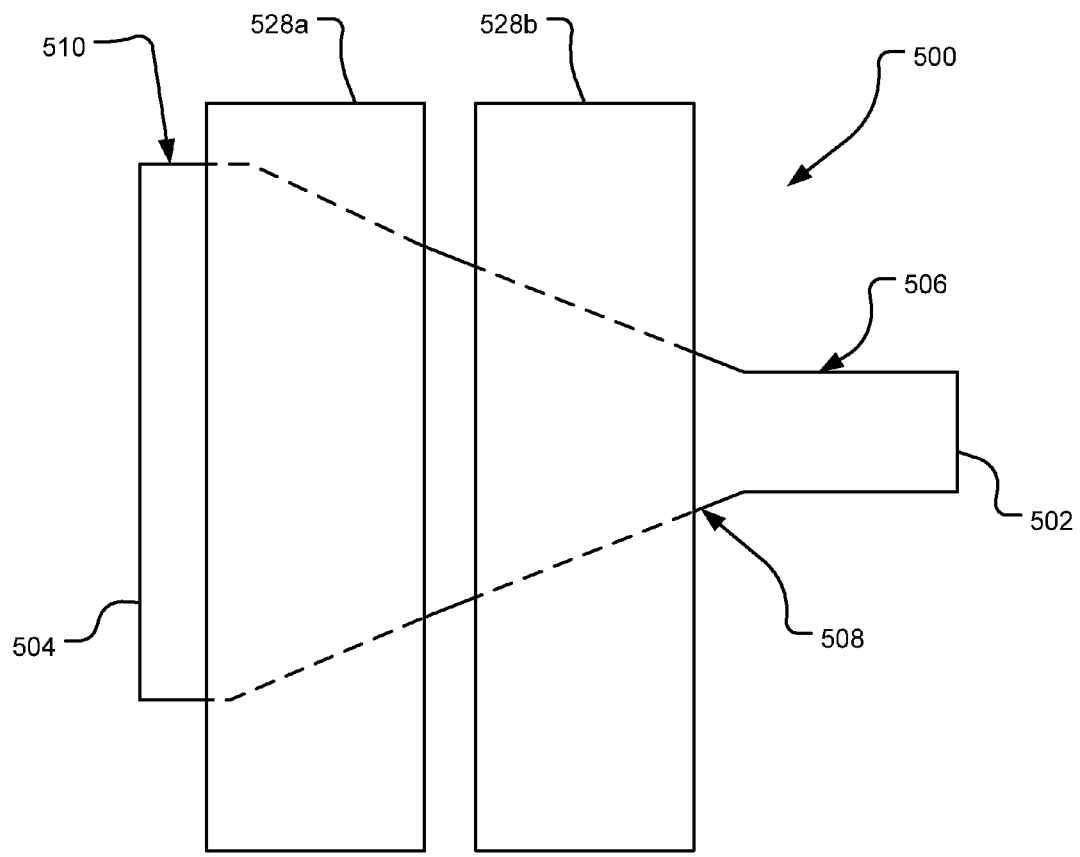
FIG. 5 is a schematic plan top view of another example write pole.

FIG. 5 illustrates another schematic example implementation of a write pole 500. Various elements or features of write pole 500 are the same as or similar to the corresponding element or feature of write poles 300, 400, unless indicated otherwise.

Write pole 500 has a pole tip 502 and an opposite back edge 504. Between pole tip 502 and back edge 504, write pole 500 has a tip portion 506, a flared portion 508, and a back extension region 510. A coil structure, having two active turns 528a, 528b, crosses a portion of flared portion 508 and back extension region 510. The distance between the back edge of active turn 528a and back edge 504 is no more than 1 micrometer, in some implementations, no more than 0.8 micrometer.

Figure 6:
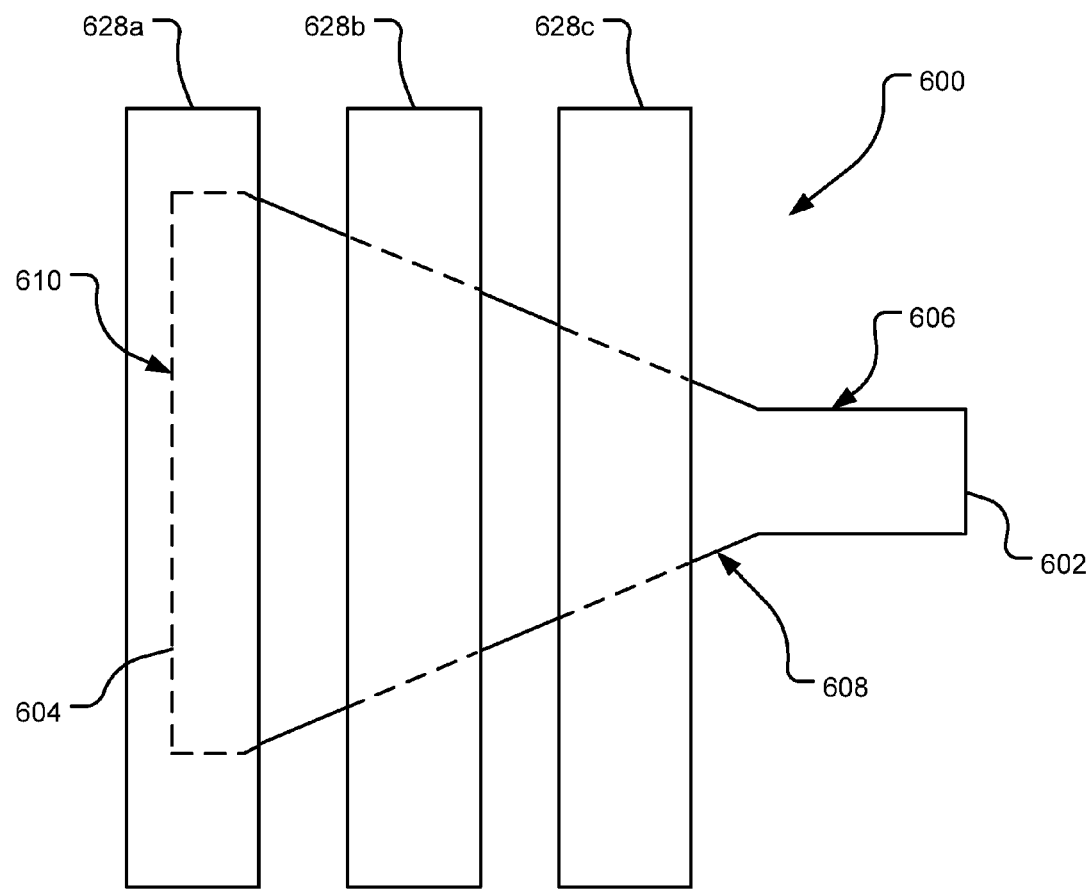
FIG. 6 is a schematic plan top view of another example write pole.

FIG. 6 illustrates another schematic example implementation of a write pole 600. Various elements or features of write pole 600 are the same as or similar to the corresponding element or feature of write poles 300, 400, 500, unless indicated otherwise.

Write pole 600 has a pole tip 602 and an opposite back edge 604. Between pole tip 602 and back edge 604, write pole 600 has a tip portion 606, a flared portion 608, and a back extension region 610. A coil structure, having three active turns 628a, 628b, 628c crosses the paddle portion, both flared portion 608 and back extension region 610. In this particular implementation, back edge 604 is overlapped by turn 628a, so that only a portion of active turn 628a crosses flared portion 608 and back extension region 610. In this implementation, the distance between the back edge of active turn 628a and back edge 604 is negative, with back edge 604 being closer to pole tip 602 than the back edge of active turn 628a.

In all of write poles 300, 400, 500 and 600, the coil turns illustrated are active turns. A dummy turn may be included in any of the implementations shown and variations thereof. Such a dummy turn may extend across a flared paddle portion, a back extension region, a combination of a flared paddle portion and a back extension region, partially extend across a back extension region, or not extend across the write pole at all.

All of the write heads described above, write heads 120, 200, and variations thereof, and write poles 124, 224, 300, 400, 500, 600, and variations thereof, can be fabricated by various methods, including plating, deposition, etching, milling, and other processing techniques.

For example, a write pole can be formed by milling deposited high magnetic moment (e.g., 2.4T or greater) material to reduce the length of the write pole to be no greater than 4.2 micrometers. In some implementations, the milling reduces the maximum length to no greater than 3.9 or 3.6 micrometers.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A write head comprising:
a write pole including a pole tip proximate to an air-bearing surface and a back edge, with a length from the pole tip to the back edge being no more than 4.2 micrometers in a direction perpendicular to the air bearing surface, and
a coil structure having two or three active turns crossing the write pole, wherein a back of the coil structure is no more than 1 micrometer past the back edge of the write pole.

2. The write head of claim 1, wherein the length from the pole tip to the back edge is no more than 3.9 micrometers.

3. The write head of claim 1, wherein the length from the pole tip to the back edge is no more than 3.6 micrometers.

4. The write head of claim 1, the write pole comprising high magnetic moment material of 2.4T or greater.

5. The write head of claim 1, wherein the back of the coil structure is no more than 0.8 micrometer past the back edge of the write pole.

6. The write head of claim 1, the coil structure comprising three active turns and a dummy turn, with the dummy turn more distal from the pole tip than the active turns.

7. The write head of claim 1, the coil structure comprising two active turns and a dummy turn, with the dummy turn more distal from the pole tip than the active turns.

8. The write head of claim 7, wherein all of the two active turns and the dummy turn are no more than 1 micrometer past the back edge of the write pole.

9. The write head of claim 1, wherein the write pole has a tip portion defining the pole tip, a flared paddle portion extending from the tip portion away from the pole tip, with the flared paddle portion defining the back edge.

10. The write head of claim 1, wherein the write pole has a tip portion defining the pole tip, a flared paddle portion extending from the tip portion away from the pole tip, and a back extension region extending from the flared paddle portion, the back extension region defining the back edge.

11. A method comprising:
fabricating a write pole including a tip portion adjacent to an air-bearing surface and adjoined to a paddle portion;
milling to remove material from the paddle portion and reduce a maximum length of the tip portion and paddle portion to no greater than 4.2 micrometers in a direction perpendicular to the air-bearing surface.

12. The method of claim 11, wherein milling reduces the maximum length to no greater than 3.9 micrometers.

13. The method of claim 12, wherein milling reduces the maximum length to no greater than 3.6 micrometers.

14. A write head comprising:
a write pole having a tip portion defining a pole tip proximate to an air-bearing surface, a back edge, and a flared paddle portion extending from the tip portion away from the pole tip toward the back edge, with a length from the pole tip to the back edge being no more than 4.2 micrometers in a direction perpendicular to the air bearing surface.

15. The write head of claim 14, with the flared paddle portion defining the back edge.

16. The write head of claim 14, the write pole further comprising a back extension region extending from the flared paddle portion, the back extension region defining the back edge.

17. The write head of claim 14 further comprising a coil structure having two or three active turns crossing the write pole, wherein a back of the coil structure is no more than 1 micrometer past the back edge of the write pole.

18. The write head of claim 17, the coil structure comprising two active turns and a dummy turn, with the dummy turn more distal from the pole tip than the active turns.

19. The write head of claim 14, the write pole comprising high magnetic moment material of 2.4T or greater.

* * * * *